3,300,431
NON-WOVEN FABRIC AND ADHESIVE
COMPOSITION THEREFOR
Kenzo Ueno, Murazi Kamichika, Yukio Sato, and Takuji Kabata, Osaka, Japan, assignors to Takeda Chemical Industries, Ltd., Osaka, Japan
No Drawing. Filed Apr. 20, 1964, Ser. No. 361,271
Claims priority, application Japan, Apr. 20, 1963, 38/20,640
15 Claims. (Cl. 260—29.6)

This invention relates to non-woven fabric and to adhesive composition employed for the preparation of non-woven fabric.

Recently, non-woven fabric has widely been employed as base of synthetic leather, industrial filters, padding of clothes, etc. When non-woven fabric is applied for practical use in these various fields, it is required to have such a porosity as meeting the respective purposes. However, it was hardly possible to give non-woven fabric porous state optionally depending on the purpose by merely simple procedure. The known methods for preparing porous non-woven fabric are as follows: web is immersed in aqueous dispersion of adhesive composition, said dispersion containing various kinds of water-soluble additives, followed by drying. Then the said water-soluble additive is eluted with water so as to make the fabric porous. Or, fibers composing non-woven fabric are first mixed with other fibers used for making the fabric porous, then the mixture is fixed by employing adhesive. Then, only the fibers employed for causing the fabric to be porous are selectively eluted with suitable solvent to obtain porous non-woven fabric. All the known processes for preparing porous non-woven fabric, however, necessitate two-step treatment which is very complicated. Accordingly, it is a desideratum of the art to prepare porous non-woven fabric by means of simple procedure. As adhesives hitherto employed for the preparation of non-woven fabric, there have been utilized latices, a mixture of latices with form-aldehyde condensate-product of urea, phenol or melamine, mixture of latices with epoxy resin etc. However, in these adhesives cross-linking reaction takes place during storage with the result of occurrence of gelation of the adhesive and loss of adhesive ability. Therefore, so as to avoid the occurrence of such unwelcome change, the adhesive had to be prepared just before its use by mixing ingredients of the adhesive.

Under such circumstances, the present inventors found that an adhesive composition comprising an aqueous dispersion which contains polymer having free carboxyl groups in the molecule and blocked polyfunctional isocyanate is preservable without any fear of occurrence of gelation. Therefore, the adhesive composition which comprises aqueous dispersion containing polymer having free carboxyl groups in the molecule and blocked polyfunctional isocyanate can be utilized as one type adhesive. It is further found that by employing the adhesive composition, porous non-woven fabric having desired grade of porosity can easily be prepared by one step, and thus prepared non-woven fabric has superior physical properties to known porous non-woven fabric, e.g. in tensile strength, tear resistance, water resistance, solvent resistance, as well as superior feel, flexibility of the fabric, crease-resistant property of the fabric etc.

The first object of this invention is to provide an adhesive composition for use in the preparation of non-woven fabric. The second object is to provide porous non-woven fabric. The first object is realized by preparing aqueous dispersion containing polymer having free carboxyl groups in the molecule and blocked polyfunctional isocyanate. The second object is realized by treating web by the said adhesive composition.

As polymer having free carboxyl groups in the molecule, there may be homopolymer of carboxylic acid containing polymerizable double bond, copolymers of one or more kinds of carboxylic acids containing polymerizable double bond with one or more kinds of compounds containing polymerizable double bond. Copolymers may similarly be employed irrespective of their being block copolymer or graft copolymer. As carboxylic acid containing polymeriazle double bond, there may for example be acrylic acid, methacrylic acid, itaconic acid, sorbic acid, maleic acid, maleic acid monoester, fumaric acid, fumaric acid monoester, aconitic acid, mesaconic acid, ethylmaleic acid, pyrocinchonic acid and xeronic acid.

Especially, employment of methacrylic acid, acrylic acid, itaconic acid, maleic acid or its monoester, fumaric acid or its monoester, etc. may be preferable in general.

As compounds containing polymerizable double bond, there may, for example, be butadiene, isoprene, 2,3-dimethylbutadiene, 2-chlorobutadiene, vinyl acetate, vinyl chloride, vinylidene chloride, acrylic acid ester, methacrylic acid ester, styrene, acrylonitrile, maleic acid diester, diallyl phthalate and allyl methacrylate. Especially, employment of diene type compounds, e.g. butadiene, isoprene, etc. may be preferable in general for increasing crease-resistant property of non-woven fabric to be produced. These diene type compounds may also be subjected in a form of copolymer with acrylonitrile, styrene, methacrylate, etc. to polymerization with carboxylic acid containing polymerizable double bond. The content of carboxyl group in the polymer is preferably not too small, so as to make non-woven fabric have desirable tensile strength and tear resistance, or not to decrease adhesive ability of the adhesive composition. In general the content of carboxyl group in the polymer is preferably at least 0.3%, desirably about 1.5–10%, by weight relative to whole polymer composition. When copolymer is employed, it is necessary that it contain at least 1%, desirably 2–30% by weight of carboxylic acid containing polymerizable double bond.

Blocked polyfunctional isocyanate means addition product of polyfunctional isocyanate to a compound containing a group that can react with free isocyanate group to form the linkage which can reversibly decompose to free isocyanate group by heating. (Hereinafter the compound containing a group that can react with free isocyanate group to form linkage that can decompose to free isocyanate group by heating, is referred to as blocking agent.) As polyfunctional isocyanate, there may be diisocyanates; triisocyanates; biuret type isocyanates; distillation residue obtained in the preparation of such isocyanates as tolylene diisocyanate, diphenylmethane diisocyanate, etc.; addition products of the said isocyanate with compound having active hydrogen atom in the ratio of NCO/active hydrogen atom $>1$ (mole); and compounds obtained by adding compound having active hydrogen atom to the said addition product in the ratio of NCO/active hydrogen atom $>1$ (mole).

Example of diisocyanates are ethylene diisocyanate, ethylene diisocyanate, propylene - 1,1 - diisocyanate, butylene-1,2-diisocyanate, hexylene - 1,6 - diisocyanate, cyclohexylene-1,2-diisocyanate, metaphenylene diisocyanate, 2,4-tolylene diisocyanate, 2,6-tolylene diisocyanate, 4,4'-diphenylmethane diisocyanate, 3,3'-dimethyl-4,4'-biphenylene diisocyanate, 3,3'-dimethoxy-4,4'-biphenylene diisocyanate, 3,3' - dichlow - 4,4 - (biphenylene diisocyanate and 4,4'-biphenylene diisocyanate.

Examples of triisocyanates are triphenylmethane-4,4'4"-triisocyanate, diphenyl-2,4,4'-triisocyanate and diphenylmethane-2,4,4'-triisocyanate.

As compounds having active hydrogen atom, there may be polyols, hydroxypolyesters, carboxypolyesters and polyetherpolyols.

Examples of polyols are ethylene glycol, diethylene glycol, triethylene glycol, propylene glycol, dipropylene glycol, butylene glycol, trimethylol propane, trimethylol ethane, hexanetriol, glycerol, sorbitol, mannitol, lactitol and glycosides.

Hydroxypolyesters or carboxypolyesters employed in this invention are those obtained by the reaction of one or more kinds of the said polyols with one or more kinds of carboxylic acids, e.g. adipic acid, oxalic acid, succinic acid, glutaric acid, pimelic acid, suberic acid, azelaic acid, sebacic acid, isosebacic acid, maleic acid, fumaric acid, phthalic acid, isophthalic acid, dimer acid and anhydrides thereof.

Polyetherpolyols employed in this invention are those obtained by condensation of one or more kinds of the said polyols or obtained by condensation of one or more kinds of the said polyols with one or more kinds of cyclic ethers, e.g. ethylene oxide, propylene oxide, butylene oxide, trimethylene oxide, α-methyl-trimethylene oxide, 3,3-dimethyl-trimethylene oxide, styrene oxide with or without the presence of amines, e.g. ethylenediamine, hexamethylenediamine, monoethanolamine, diethanolamine, triethanolamine.

Blocking agent may be any of the known ones. For example, there may be employed phenols such as phenol, thiophenol, methylphenol, methylthiophenol, dimethylphenol, ethylphenol, ethylthiophenol, cresol, xylenol, resorcinol; tertiary alcohols such as tertiary butanol, tertiary pentanol, tertiary butanethiol, tertiary hexanol, tertiary hexanethiol; aromatic amines such as diphenylamine, diphenylnaphthylamine, imides such as succinic acid imide, phthalic acid imide; compounds having active methylene group such as acetoacetic acid ester, acetylacetone, malonic acid diester; mercaptanes such as 2-mercapto - benzothiazol, tertiary dodecylmercaptane; lactams such as ε-caprolactam, δ-valerolactam, γ-butyrolactam, β-propiolactam; ethylenimine and its derivatives; oximes such as acetoxime, methylethylketone oxime, cyclohexanone oxime; adduct of bisulfite; and dimer of aromatic monoisocyanates. Especially, employed of such blocking agents as phenol cresol, xylenol, oximes, and compounds having active methylene group may give preferable effect for the purpose of this invention in most cases.

Blocked polyfunctional isocyanate is prepared by applying known method for the said polyfunctional isocyanate and blocking agent.

In the blocked polyfunctional isocyanates, employment of addition product of tri- or more functional isocyanates to blocking agents or addition product of blocking agent to compound obtained by adding di- or more functional isocyanate to compound having active hydrogen atom, especially to hydroxy- or carboxypolyester or polyetherpolyol in the ratio of NCO/active hydrogen atom > 1, may be preferable in view point of physical property of the non-woven fabric, e.g. tensile strength, tear resistance, oil resistance, water resistance, crease-resistant property, etc. Especially the latter product, i.e. addition product of blocking agent to compound obtained by adding di- or more functional isocyanate to compound having active hydrogen atom in the ratio of NCO/active hydrogen atom > 1 is preferable, because not only the adhesive ability of the adhesive composition of this invention but also physical properties and feel, flexibility of non-woven fabric prepared by employing the adhesive composition are excellent, which may be due to the fact that the adhesive composition is plasticized in the molecule.

Adhesive composition of this invention is utilized in a state of aqueous dispersion. The preparation of the dispersion is carried out by alternative procedures. That is, polymer having free carboxyl groups in the molecule is mixed with blocked polyfunctional isocyanate, followed by subjecting the mixture to dispersion. Or, polymer having free carboxyl groups in the molecule and blocked polyfunctional isocyanate are subjected to dispersion separately, and subsequently the two dispersions are mixed. In most cases, the latter procedure may be preferable because of, for example, the simplicity of the procedure.

Dispersion of polymer having free carboxyl groups in the molecule is prepared by subjecting monomers to emulsion polymerization directly or by subjecting polymer having free carboxyl groups in the molecule, which is prepared by the known method, to dispersion mechanically.

Dispersion of blocked polyfunctional isocyanate is prepared by subjecting blocked polyfunctional isocyanate to dispersion by means of known process with or without the presence of dispersing agent. In this case, blocked polyfunctional isocyanate may be made as emulsion by being dissolved in suitable solvent or as aqueous dispersion by employing dispersing agent and protective colloid.

A preferable ratio of blocked polyfunctional isocyanate (I) relative to polymer containing free carboxyl groups in the molecule (II) varies with conditions, for example, contents of carboxyl group in the polymer, etc. In general, however, the ratio of I/II (weight) is most preferably about 0.01–2.5. Particularly, when such polymers are employed that are constituted with monomers, approximately 1–30% (weight) of the latter being carboxylic acid having polymerizable double bond, the ratio of I/II (weight) is preferably about 0.03–0.5.

The content of the solid matter (polymer having free carboxyl groups and blocked polyfunctional isocyanate) in aqueous dispersion of adhesive composition of this invention may preferably be about 1–50% by weight.

Further, if necessary, various kinds of additives, e.g. pigment, age resister, softener, reinforcing material, water repellent, moth-proofing agent, flame retarder, etc. may be added to the aqueous dispersion of adhesive composition of this invention. Or, gelling agent may be added to the aqueous dispersion of adhesive composition of this invention to make the composition itself to be heat sensitive, when used for the preparation of non-woven fabric.

Next, explanation concerning the method of making non-woven fabric is made.

Fibers may be natural or synthetic. For example, there may be employed one or more kinds of such fibers as cotton, rayon, acetate rayon, polyester type fiber, polyamide type fiber, polyvinylalcohol type fiber, acryl type fiber, etc. Non-woven fabric of this invention can be prepared by applying a known method for preparing known non-woven fabric. More concretely stated, web in which fibers are random- or semi-oriented is prepared by dry method. Then, the web is immersed in the aqueous dispersion of adhesive composition of this invention in a saturator in a state of being placed between wire nettings. Excess of the aqueous dispersion is removed with squeeze roll or with suction in vacuum. Or, the said web may be subjected to punching by needle-room, followed by spraying over the web aqueous dispersion of adhesive composition of this invention, or by the immersion of the web into an aqueous dispersion of adhesive composition of this invention. Or, to make web composing of relatively short filaments, relatively short filaments are dispersed in aqueous dispersion of adhesive composition of this invention or in suitable solution. Subsequently, in the former case, they are withdrawn to obtain web, and then dispersion is removed from the web by pressing to control the wet pickup amount. In the latter case, the web obtained in the same way from suitable solution is immersed with or without being dried, in aqueous dispersion of adhesive composition of this invention. Though wet pickup amount varies with concentration of dispersion of the adhesive composition of this invention, manner of pressing the web, etc., it may, in general preferably be about 2–4 times as much as the weight of web.

Subsequently, thus treated web is subjected to curing. As the procedure for curing, any of known procedures for curing is applicable. Temperature and time required for curing may be controlled depending on the respective case. In general, however, curing may preferably be carried out at about 110–250° C., especially at about 130–170° C. In most cases, time required for curing may be sufficient in about 3–10 minutes. If necessary, curing may be carried out in the presence of suitable catalyst to make the temperature relatively low. By the treatment of curing, non-woven fabric is made effectively porous. The reason is presumed to be due to generation of carbon dioxide by the reaction between carboxyl group and isocyanate group regenerated by curing. When volative blocking agent is employed, the volatilization of the blocking agent may contribute to make the web porous.

Dry pickup weight is preferably about 30–80% by weight relative to the untreated web.

The following examples are illustrative embodiments of the invention, but they are not intended to limit the scope of this invention. In the specification, the percentages are all in weight percent and part means part by weight.

EXAMPLE 1

A mixture of 4.0 parts of sodium alkylbenzenesulfonate, 1.0 part of polyoxyethylene octylphenol, 160 parts of deionized water, 0.15 part of sodium hydrogensulfite, 0.5 part of tertiary dodecylmercaptane, 5.0 parts of methacrylic acid, 40.0 parts of acrylonitrile and 55.0 parts of butadiene is agitated to be brought into an emulsion. Then after controlling the emulsion to 50° C., polymerization is started under an elevated pressure in acidic conditions by adding 30 parts of 3% aqueous solution of potassium persulfate as a polymerization initiator. The polymerization is stopped by the addition of aqueous solution of potassium dimethylthiocarbamate. After the resultant emulsion is adjusted to pH 8.5 with aqueous ammonia, age resister in an amount of 1.5% relative to total amount of latex in a state of emulsion is assocaited therewith for the purpose of improving thermal resistance and light resistance. Latex thus obtained is referred to as (I). Total content of the solid matter in the latex (I) is 35%.

4,4'-diphenylmethane diisocyanate (hereinafter referred to as MDI) and m-cresol, the molar ratio being 1:2, are dissolved in anhydrous toluene and the solution is refluxed for 10 hours. After cooling, white crystals (MDI-m-cresylurethane) melting at 146–147° are obtained in approximately theoretical amount.

100 parts of MDI-m-cresylurethane, 1 part of sodium dioctylsulfosuccinate, 3 parts of sodium salt of condensate of naphthalenesulfonic acid wih formaldehyde and 296 parts of water are mixed in a ball mill for 24 hours to obtain stable aqueous dispersion containing 26% of blocked MDI. Thus obtained dispersion is referred to as (II).

(I) and (II) can be mixed with each other in an optional ratio. And a mixture of (I) and (II) can be preserved as it is, without any fear of decomposition or gelation.

286 parts of (I) and 115 parts of (II) are mixed, to which is added 5 parts of polyoxyethylene octylphenol so as to increase mechanical stability. Further 139 parts of water are added to control the content of the solid matter in the dispersion to 25%. Thus the adhesive composition in a state of dispersion is obtained.

Thus obtained dispersion of adhesive composition is put in a saturator. Then 50 grams per square meter of random web prepared from Tetron (polyethylene terephthalate) (3 deniers) by dry method is immersed in a state of being placed in wire netting (40 meshes), followed by squeezing with roll to control the weight of wet web to 200 grams per square meter. The web is dried at 100° C. for 10 minutes, followed by heating at 200° C. for 5 minutes to obtain porous non-woven fabric. Weight of thus produced non-woven fabric: 79 grams per square meter.

EXAMPLE 2

A mixture of 4.0 parts of potassium laurysulfate, 1.0 part of polyoxyoctylphenol, 160 parts of deionized water, 0.15 part of sodium hydrogen sulfite, 30 parts of 3% aqueous solution of potassium persulfate, 0.5 part of tertiary dodecylmercaptane, 5 parts of methacrylic acid, 5 parts of acrylic acid, 20.0 parts of styrene and 70 parts of butadiene is treated in the same way as in Example 1 to obtain styrene rubber latex containing carboxylic acid. The latex is referred to as (I). The content of solid matter in (I) is 35%. To 100 parts of blocked adduct of tolylene diisocyanate (Allied Chemical Corp., U.S.A. "Nacconate–80") to trimethylol propane with ethylenimine, which is made into a state of solution are added 400 parts of water, 5 parts of sodium polyethylene tridecylsulfate and 1 part of polyoxyethylene octylphenol, followed by subjecting to emulsification to obtain stable emulsion of blocked adduct of tolylene diisocyanate to trimethylol propane with ethylenimine. The emulsion is referred to as (II). Total solid matter in (II) is 20%.

(I) and (II) can be mixed with each other in an optional ratio, and a mixture of (I) and (II) can be preserved as it is, without any fear of gelation.

To the mixture of 286 parts of (I) with 75 parts of (II) are added 5 parts of polyoxyethylene octylphenol and 10 parts of 50% aqueous dispersion of zinc white for the purpose of increasing stabilization of the adhesive. Then, 124 parts of water is added to the resultant dispersion to adjust the content of solid matter in the dispersion of adhesive to 25%.

By employing thus obtained dispersion of adhesive, web is treated in the same way as in Example 1, except heating web at 150° C. instead of heating at 200° C. Weight of thus produced non-woven fabric: 85 grams/meter$^2$.

EXAMPLE 3

A mixture of 7 parts of alkylarylpolyether sodium sulfonate, 150 parts of deionized water, 60 parts of ethyl acrylate, 30 parts of methyl methacrylate and 10 parts of methacrylic acid is agitated to be brought into emulsion. Then, 25% of the whole volume of thus prepared emulsion is put in the polymerization vessel, to which are added 30 parts of water, 0.2 part of ammonium persulfate and 0.2 part of sodium hydrogen sulfite. Then, residual emulsion is gradually added to the resultant mixture in 2 hours with stirring at 50° C., followed by heating up to 90° C., to complete the polymerization. Subsequently, the resultant mixture is cooled to a room temperature and pH is adjusted to 8.5 with aqueous ammonia to obtain stable aqueous dispersion (I), which contains 38% of solid matter.

100 parts of polyether composing of trimethylol propane and propylene oxide (average molecular weight: 1050) is added dropwise to 50 parts of tolylene diisocyanate ("Nacconate–80"), which was heated beforehand up to 90° C., followed by heating for 90 minutes with stirring to obtain prepolymer.

To thus prepared prepolymer is added 58 parts of tertiary dodecyl mercaptane, followed by heating at 90° C. for 6 hours to obtain blocked prepolymer.

100 parts of blocked prepolymer thus prepared, 400 parts of water, 5 parts of sodium polyethylene dodecylsulfate and 1 part of polyoxyethylene octylphenol are agitated in homogenizer to obtain emulsion (II) which contains about 20% of solid matter.

(I) and (II) can be mixed together in an optional ratio, and a mixture of (I) and (II) can be preserved as it is, without any fear of decomposition or gelation.

264 parts of (I) is mixed with 250 parts of (II), to which is added 86 parts of water to obtain dispersion of adhesive which contains about 25% of solid matter.

Non-woven fabric is prepared by treating web with thus prepared adhesive dispersion in the same way as in Example 1. Weight of thus prepared non-woven fabric: 75 grams/meter$^2$.

EXAMPLE 4

3 parts of sodium laurylsulfate, 130 parts of deionized water, 50 parts of vinyl chloride, 48 parts of vinylidene chloride and 2 parts of maleic anhydride are put in jacket-heating type pressure-proof polymerization vessel made of stainless steel and are agitated at 50° C. to carry out polymerization. The polymerization is continued for 14 hours. Thus produced dispersion contains 40.3% of solid matter, and the monomer conversion is 91%. To the resultant mixture, 50% aqueous dispersion of lead distearate is added up to the amount of 3% relative to the total content of solid matter to obtain aqueous dispersion (I) which contains 40.5% of solid matter.

1 mole of tolylene diisocyanate ("Nacconate–80") is dissolved in acetone, to which is added gradually at 5° C. a solution prepared from 1.1 moles of ethylenimine and acetone. After 1 hour's stirring, white crystals (tolylene diethylene urea) are collected by filtration. The yield is approximately theoretical.

30 parts of thus obtained crystals, 70 parts of dimethylformamide, 1.5 parts of sodium dodecyl benzene sulfonate and 108.5 parts of water are emulsified to obtain aqueous emulsion (II) which contains 15% of solid matter.

(I) and (II) can be mixed together in an optional ratio, and a mixture of (I) and (II) can be preserved as it is, without any fear of gelation.

Then, 247 parts of (I) and 133.6 parts of (II) are thoroughly mixed to obtain aqueous dispersion of adhesive.

Web is treated in the same way as in Example 1 by employing thus prepared adhesive, except heating at 140° C. for 5 minutes in place of heating at 200° C. to obtain porous non-woven fabric.

EXAMPLE 5

1 part of sodium lauryl sulfate, 3 parts of copolymer of ethylene-oxide with propylene oxide, 123 parts of deionized water, 95 parts of vinyl acetate and 5 parts of acrylic acid are put in a jacket-type heating polymerization vessel equipped with stirrer and reflux condenser and 7 parts of 3% aqueous solution of potassium persulfate is added to the mixture at 60° C. to allow polymerization to take place. Polymerization is continued for 9 hours. After polymerization, nitrogen gas is introduced to remove monomers which remain unreacted, followed by adjusting pH to 8.0 with aqueous ammonia to obtain aqueous dispersion (I) which contains 40% of polymer containing carboxyl groups.

104 parts of tolylene diisocyanate ("Nacconate–80") and 30 parts of toluene are heated at 100–110° C. in a reaction vessel, followed by the gradual addition of 100 parts of polyester dropwise (polyester which comprises 88 parts of adipic acid, 36 parts of ethylene glycol and 13 parts of trimethylol propane, and which shows hydroxyl number 320 and acid number not more than 4). The reaction is continued for about 90 minutes. Then, after the addition of 33 parts of m-cresol, the reaction is further continued for 6 hours at the same temperature to obtain blocked prepolymer. Thus prepared blocked prepolymer is treated in the same way as in Example 3 to obtain aqueous emulsion II which contains 20% of solid matter.

(I) and (II) can be mixed together in an optional ratio, and a mixture of (I) and (II) can be preserved as it is, without any fear of decomposition or gelation.

250 parts of (I) is mixed with 100 parts of (II) and 20 parts of 50% zinc white dispersion to obtain an aqueous dispersion of adhesive.

Nylon staple composed of filaments, the length of which are respectively 2 millimeters and 4 millimeters in 1:1, is dispersed in water with stirring, to which are added sodium polyacrylate and the said dispersion of adhesive until the concentration of nylon staple becomes 10%. The nylon staple is withdrawn, followed by removing the adhesive by pressing to control the weight of wet web to 400 grams per square meter. The web is dried at 100° C. for 20 minutes and then heated at 180° C. for 5 minutes to obtain non-woven fabric. Weight of thus produced non-woven fabric is 90 grams per square meter.

Having thus disclosed the invention, what is claimed is:

1. Adhesive composition for preparing non-woven fabric, which comprises (a) an aqueous dispersion containing polymer consisting of 1–30% by weight of carboxylic acid having polymerizable double bond and 99–70% by weight of compound having polymerizable double bond, the content of free carboxyl groups being at least 0.3% by weight relative to the polymer, and (b) blocked polyfunctional isocyanate in approximately 1–50% by weight, the ratio of blocked polyfunctional isocyanate relative to polymer being approximately 0.01–2.5 by weight.

2. Adhesive composition claimed in claim 1, wherein the carboxylic acid having polymerizable double bond is a member selected from the group consisting of acrylic acid, methacrylic acid, itaconic acid, sorbic acid, maleic acid, maleic acid monoester, fumaric acid, fumaric acid monoester, aconitic acid, mesaconic acid, ethylmaleic acid, pyrocinchonic acid, xeronic acid and a mixture thereof, and wherein the compound having polymerizable double bond is a member selected from a group consisting of butadiene, isoprene, 2,3-dimethylbutadiene, 2-chlorobutadiene, vinyl acetate, vinyl chloride, vinylidene chloride, acrylic acid ester, methacrylic acid ester, styrene, acrylonitrile, maleic acid diester, diallylphthalate, allyl methacrylate and a mixture thereof.

3. Adhesive composition claimed in claim 1, wherein the carboxylic acid is itaconic acid.

4. Adhesive composition claimed in claim 1, wherein the carboxylic acid is maleic acid.

5. Adhesive composition claimed in claim 1, wherein the carboxylic acid is fumaric acid.

6. Adhesive composition claimed in claim 1, wherein the carboxylic acid is acrylic acid.

7. Adhesive composition claimed in claim 1, wherein the carboxylic acid is methacrylic acid.

8. Adhesive composition claimed in claim 1, wherein the compound having polymerizable double bond is diene type compound.

9. Adhesive composition claimed in claim 1, wherein the compound having polymerizable double bond is butadiene.

10. Adhesive composition claimed in claim 1, wherein the compound having polymerizable double bond is copolymer of butadiene and methacrylic acid ester.

11. Adhesive composition claimed in claim 1, wherein the compound having polymerizable double bond is a copolymer of butadiene and styrene.

12. Adhesive composition claimed in claim 1, wherein the compound having polymerizable double bond is a copolymer of butadiene and acrylonitrile.

13. Adhesive composition claimed in claim 1, wherein the blocked polyfunctional isocyanate is a reaction product of blocking agent for isocyanate with polyisocyanate containing at least two isocyanate groups.

14. Adhesive composition claimed in claim 13, wherein the isocyanate is addition product of a compound having active hydrogen atoms with polyisocyanate in the ratio of more than one NCO group per active hydrogen atom, said compound having active hydrogen atoms being selected from the group consisting of polyesters and polyether-polyols.

15. Porous non-woven fabric bearing a thermally cured adhesive composition as defined in claim 1, the dry pickup percent being about 30 to 80% by weight of the fabric per se.

References Cited by the Examiner

UNITED STATES PATENTS

| | | | |
|---|---|---|---|
| 2,931,749 | 4/1960 | Kine et al. | 117—140 |
| 2,949,386 | 8/1960 | Cassel | 117—140 |
| 2,961,348 | 11/1960 | Finnegan et al. | 117—140 |
| 2,994,672 | 8/1961 | Geerdes | 260—29.6 |

MURRAY TILLMAN, *Primary Examiner.*

W. J. BRIGGS, *Assistant Examiner.*